Patented Jan. 18, 1938

2,105,665

UNITED STATES PATENT OFFICE 2,105,665

CHROMIUM SULPHOMOLYBDATE CATALYST

Wilbur Arthur Lazier, New Castle County, Del., and John Victor Vaughen, Lakewood, Ohio, assignors to E. I. du Pont de Nemours & Company, Wilmington, Del., a corporation of Delaware No Drawing. Application September 20, 1935, Serial No. 41,374

6 Claims. (Cl. 23—236)

This invention relates to the preparation and use of new and improved sulphur-insensitive catalyst compositions. More particularly it relates to improved methods for the preparation of hydrogenation catalysts of the sulphomolybdate type.

Catalysts useful for the hydrogenation of organic compounds are well known in the art, but most of these catalysts possess the considerable disadvantage that they are quickly poisoned and rendered inactive by the presence of sulphur and other well-known catalyst poisons. Certain investigators, however, (notably Krauch and Pier, U. S. Patents 1,890,434 to 1,890,437, inclusive; Varga and Hupe, U. S. Patents 1,852,988 and 1,876,007 and 7,876,008, inclusive, and 1,894,924 to 1,894,926, inclusive) have prepared catalysts which are claimed to be relatively insensitive to sulphur. These catalysts consist for the most part of metallic oxides or sulphides or mechanical mixtures thereof.

It is an object of this invention to prepare new and improved catalysts for the hydrogenation of organic compounds. A further object is to prepare catalysts which are insensitive to sulphur or other ordinary catalyst poisons, and a still further object is to prepare catalysts of the sulphomolybdate type, comprising essentially a chemical compound of sulphomolybdate or its equivalent with other important catalytic constituents. Other objects will appear hereinafter.

It has now been found that very active hydrogenation catalysts which are insensitive to sulphur or other ordinary catalyst poisons may be prepared, which comprise essentially the sulphomolybdate group or the equivalent seleno- or telluro-molybdate groups, in chemical combination with hydrogenating base metals of the first, second, seventh and eighth groups of the periodic table.

Several methods by which these catalysts may be prepared and their specific application to catalytic hydrogenation reactions are illustrated in the following examples:

Example 1

A sulphur-insensitive catalyst is prepared as follows: A solution of commercial chromium nitrate is first prepared by dissolving 1500 grams of chromium nitrate in 28 liters of water at a temperature of 65° to 75° C. A second solution containing 1720 grams of ammonium molybdate in 9 liters of water is added to form an apple-green precipitate of chromium molybdate. Hydrogen sulphide is then passed into the slurry for a period of about four hours, during which time the precipitate is changed in color from apple-green to a dark brown. By this treatment the chromium molybdate is converted in part to chromium sulphomolybdate and a portion of the molybdenum is redissolved as a soluble sulphomolybdate. In order to reprecipitate this compound, such a quantity of dilute nitric acid is added as is just sufficient to render the mother liquor colorless; i. e., free from sulphomolybdate. The dark colored precipitate is now filtered off, washed, and dried. In this way a hard, black, vitreous mass of chromium sulphomolybdate is obtained which has excellent physical form for catalytic purposes.

In carrying out the hydrogenation of an aromatic hydrocarbon with a chromium sulphomolybdate catalyst prepared as described above, 25 cc. of the contact mass is loaded into a pressure-resisting tube. A mixture of toluene vapor and hydrogen is passed over the catalyst at a temperature of 425° to 450° C. and at a total pressure of 2600 to 2700 pounds per square inch. The rate of flow is about 100 cc. of the liquid hydrocarbon per hour with a hydrogen flow sufficient to give a hydrogen-toluene molecular ratio of 7.4. The condensate from the reaction consists of a mixture of naphthenic and paraffinic hydrocarbons boiling between 56° and 111° C. and containing substantial quantities of hexahydrotoluene. About 85% of the toluene is thus converted to the various hydrogenated products.

In place of hydrogen sulphide, hydrogen selenide may be used for the preparation of a chromium selenomolybdate catalyst in the manner described for the sulphomolybdate and with similar catalytic results.

Example 2

A solution containing one mole of ammonium molybdate and three moles of ammonium bichromate in six liters of water is treated with hydrogen sulphide gas. During the course of a few hours the chromate is reduced by the hydrogen sulphide and the molybdate is converted to sulphomolybdate. A precipitate is formed which corresponds very closely to the chromium sulphomolybdate described in Example 1. In order to recover the dissolved sulphomolybdate the solution is acidified with dilute nitric acid and the precipitate is filtered and dried. A product is obtained which is slightly different in physical form than that described in Example 1. The material is soft and chalky and may be powdered easily, in which form it is applicable to use in the liquid phase hydrogenation of the higher boiling hydrocarbons such as naphthalene and the anthracene. Alternatively, the catalyst may be briquetted and crushed to a granular form suitable for use in a continuous hydrogenation process as described in Example 1.

Example 3

A solution of 70.6 grams of ammonium molybdate in one liter of water is treated with hydrogen sulphide gas until the initial precipitate is redissolved to form a dark solution. To this solution there is added a solution of 174.6 grams of cobalt nitrate in one liter of water. The mixture is stirred well and filtered. After washing by decantation the precipitate is dried and crushed to size. About 42.5 cc. per hour of melted naphthalene is vaporized and pumped over the catalyst together with hydrogen at 425° C. and at 2725 pounds hydrogen pressure, the molar ratio of hydrogen to naphthalene being 15. The condensate obtained from this reaction is liquid, and boils between 181° and 210° C. About 75% of the naphthalene has been hydrogenated to tetralin and decalin by this process.

Example 4

A solution of ammonium molybdate prepared by dissolving 1720 grams of the commercial salt in nine liters of water is treated for several hours with hydrogen sulphide gas. The solution turns dark at first and then changes to red and a precipitate is formed which redissolves on further treatment with hydrogen sulphide. The heavy, dark solution thus formed is added to a solution of 1500 grams of commercial chromium nitrate in 28 liters of water. After thorough mixing, dilute nitric acid is added until a test portion indicates that the mother liquor is free from dissolved sulphomolybdate salt; that is, until the mother liquor is colorless. The precipitate from this reaction may be washed by decantation if desired, filtered and dried. The granular product thus obtained may be briquetted and crushed to a grain size suitable for use in a continuous or flow process. Alternatively, the catalyst may be used in the liquid phase for the hydrogenation of naphthalene or other aromatic hydrocarbons. About 150 grams of naphthalene is dissolved in 100 grams of warm decalin. About 15 grams of finely powdered catalyst is added and the mixture is heated to 435° under a hydrogen pressure of 3000 pounds per square inch.

With suitable agitation the naphthalene is converted in good yield to a mixture of tetralin and decalin.

Example 5

An autoclave is charged with a sulphur-contaminated phenanthrene and about 10% by weight of the chromium sulphomolybdate catalyst described in Example 1. The catalyst is finely powdered before use. Hydrogen under a pressure of 3000 pounds per square inch is admitted to the autoclave and the temperature of the hydrocarbon-catalyst mixture is raised to 350° C. Hydrogen is absorbed and considerable quantities of hydrogenated products may be recovered from the reaction mixture and identified as such by distillation analysis.

Example 6

A sample of unrefined gasoline obtained from a cracking process, having an iodine number of 90.7 and a sulphur content of 0.18% was vaporized and the vapor passed at the rate of 4 liters per hour, together with 8 liters per hour of hydrogen, at 400° C. over 20 cc. of the chromium sulphomolybdate catalyst described in Example 1 above, whereby the iodine number of the gasoline was reduced to 40 and the sulphur content was reduced to 0.009%.

Example 7

A catalyst consisting of cobalt sulphomolybdate was prepared as described in Example 3 above and used for the hydrogenation of naphthalene. Molten naphthalene was injected into a pressure resistant catalyst chamber where it was heated to 375° to 395° C. and passed over 25 cc. of the catalyst under a pressure of 3000 pounds per square inch at the rate of 100 cc. per hour, together with hydrogen, in the ratio of 10 moles per mole of naphthalene. The hydrogenated product obtained consisted of 31% decalin, 66% tetralin, and 3% of unchanged naphthalene and tarry residue.

Example 8

A catalyst comprising chromium selenomolybdate was prepared in a manner similar to that described in Example 1 above, except that hydrogen selenide was substituted for hydrogen sulphide. By passing 8 liters per hour of a gaseous mixture consisting of 75% hydrogen and 25% ethylene over 10 cc. of the catalyst at 400° C., the ethylene was hydrogenated quantitatively to ethane. Under the same conditions chromium sulphomolybdate catalyst, prepared as described in Example 1, gave 96% conversion, while a catalyst consisting of molybdenum sulphide, prepared by treating a solution of ammonium molybdate with hydrogen sulphide in the absence of other metal salts, gave only 85 to 90% conversion.

Example 9

A chromium sulphomolybdate catalyst prepared as described in Example 1 was used for the desulphurization of benzene by gas phase hydrogenation. Benzene containing one per cent of thiophene was vaporized at the rate of 32 cc. per hour and passed over 20 cc. of the catalyst, together with 6 to 10 liters of hydrogen per hour, at a temperature of 450° C. and at atmospheric pressure. A considerable amount of hydrogen sulphide was present in the exit gas and the benzene so treated was found to contain less than 0.1% of thiophene.

Example 10

By passing 4.78 liters per hour of a mixture consisting of 50% carbon monoxide and 60% hydrogen, together with 20.6 liters per hour of steam, over 10 cc. of a chromium sulphomolybdate catalyst, prepared as described in Example 1, at 400° C., there was obtained a conversion of carbon monoxide and water to carbon dioxide and hydrogen equal to 80% of theoretical. Under essentially similar conditions a catalyst consisting of molybdenum sulphide gave only 28% of the theoretical conversion.

Example 11

Pyridine was passed at the rate of 100 cc. per hour, together with hydrogen in the ratio of 10 moles per mole of pyridine, over 25 cc. of cobalt sulphomolybdate, prepared as described in Example 3, under 3000 pounds pressure at a temperature of 370° C., whereby 70% of pyridine was converted to a mixture of tetrahydro pyridine and piperidine, together with small amounts of pentane and high-boiling derivatives.

*Example 12*

Oleic acid was hydrogenated by passing the acid at the rate of 100 cc. per hour mixed with hydrogen in the ratio of 10 moles per mole of acid, over 25 cc. of chromium sulphomolybdate, prepared as described in Example 1, at 3000 pounds per square inch pressure and at temperatures ranging from 385° to 410° C. There was obtained 75 to 95% hydrogenation of the carboxyl group yielding a mixture of octadecyl and 9, 10-octadecyl alcohols and the corresponding hydrocarbons.

*Example 13*

Under the same conditions as described in Example 12 above, except that the temperature was 350° C., acetonitrile was hydrogenated to yield a mixture of ethyl, diethyl, and triethyl amines with a catalyst, prepared as described in Example 3 and consisting of cobalt sulphomolybdate.

Whereas certain definite catalyst compositions have been described in the above examples, the invention need not be limited to those described in detail. Suitable catalyst compositions may, for example, comprise the sulphomolybdates of chromium or other metallic elements of the first, second, seventh or eighth periodic groups or the equivalent seleno- or telluro- compounds. For instance, in addition to the catalyst compositions described in the above examples, we may also use such compositions as iron or manganese sulphomolybdates, chromium selenomolybdate, copper sulphomolybdate, nickel sulphomolybdate, and the like, when prepared by suitable methods, such as those described above, which yield stable compounds.

It is not necessary to confine the catalyst preparation to the use of hydrogen sulphide as illustrated in the examples. Hydrogen selenide or hydrogen telluride may be substituted for hydrogen sulphide if the proper allowances are made for the difference in characteristics of these gases. Although we prefer the sulphides mentioned, the analogous selenium compounds are also active and, for some purposes, have definite advantages over catalysts prepared by known methods. In carrying out the methods of catalyst preparation as outlined in the examples of this specification, it is not necessary to follow all the directions in detail. For instance, we have mentioned the use of chromium nitrate as a source of the chromium components of the various catalysts. It is intended also that other soluble salts of chromium may be used. Chromium chloride, sulphate or acetate may be substituted for chromium nitrate, making the necessary allowances for difference in molecular weights of the various salts. Likewise, it is not necessary to confine the source of molybdenum to ammonium molybdate. Other alkali molybdates may be used. For instance, sodium paramolybdate may be substituted in equivalent amount for ammonium molybdate in any of the examples mentioned, care being taken in this case that the precipitated material is washed at least moderately well.

The non-metallic activating agents such as sulphur, selenium or tellurium may be introduced in several ways. For example, chromium molybdate may be treated with hydrogen sulphide or ammonium or sodium sulphides or polysulphides may be used, but in the latter case it is desirable before drying to wash out any excess of sodium salt that may be present in the product. It is to be understood that, whenever throughout the specification and claims the terms sulphur, sulpho-, sulphide or sulphiding agents are used, selenium or tellurium and their analogous terms are intended as permissible alternatives.

Although we prefer completely to substitute sulphur for oxygen in the sulphiding treatment above described; that is, convert all of the oxygenated metal to the analogous sulpho-compound, various degrees of this conversion will suffice for certain purposes.

In the recovery of dissolved molybdenum from the mother liquor by the addition of dilute acid, the preparation is not limited to the use of dilute nitric acid. This step may be accomplished by the addition of any dilute acid, or it may be omitted, but care should be taken not to add more than is just sufficient to render the mother liquor colorless.

It is not necessary to confine the catalyst composition to the ratios of the various constituents given in the examples. For instance, it is possible to obtain a catalyst of high activity from preparations containing equivalent amounts of chromium and molybdenum or of cobalt and molybdenum, as well as from those containing either chromium or molybdenum in excess.

In using the catalysts described in this specification for hydrogenation reactions, it is not necessary to confine the limits of operation of the processes to those specified in the examples. The temperature limits are fixed by the activity of the catalyst, and by the nature of the compound undergoing hydrogenation. For instance, the catalyst may be used at temperatures from 200° C. to 800° C. with full manifestation of activity, although we prefer to confine our operations to temperatures below 600° C. in order to avoid thermal decompositions of the compounds to be hydrogenated. Likewise, it is unnecessary to confine the pressure limits of the processes described to the values stated in the examples. For instance, in the hydrogenation of toluene any pressure between the limits of 25 to 200 atmospheres may be used. Likewise, in the hydrogenation of naphthalene and its homologs any pressure between the limits of 50 to 750 atmospheres may be used. In the hydrogenation of ethylene or gasoline or the desulphurization of hydrocarbons atmospheric pressure may be used while, on the other hand, the hydrogenation of pyridine, oleic acid, or aniline may require from 2000 pounds to 4000 pounds pressure.

The hydrogenation reactions in question may be carried out in the vapor phase in several ways. For instance, the compound to be hydrogenated may be entrained in a stream of hydrogen which subsequently passes over the heated catalyst at atmospheric or super-atmospheric pressure. Another variation is first to vaporize the compound, mix with hydrogen and then pass over the catalyst at an elevated temperature and a suitable pressure.

The catalytic reaction may be effected according to the so-called liquid phase method. This method may take the form of a continuous traveling film in which the compound to be hydrogenated is allowed to flow over a granular catalyst in the presence of hydrogen, or the operation may be a batch process wherein a charge consisting of the compounds to be hydrogenated with catalyst particles suspended in it is heated in the presence of hydrogen in a suitable vessel such as an autoclave.

In the vapor phase method the hydrogen ratio may be as low as one mole of hydrogen per mole of compound. For economic reasons, however, it is better to use higher hydrogen ratios, such as 10 parts of hydrogen per part of compound undergoing hydrogenation, because higher yields will be obtained.

The advantages of the present invention are readily apparent from the foregoing discussion. Not only are the new catalysts easy to prepare, relatively inexpensive, and remarkably effective, but they resist deterioration to a degree hitherto unknown. They show little tendency toward poisoning or the deposition of carbon and are themselves inert to the action of water and hydrogen. By means of the process described, it is possible to carry out the hydrogenation of crude or sulphur-containing compounds, particularly hydrocarbons, over an extended period and on a scale hitherto impossible by prior art methods.

It is apparent that many variations of this invention may be made without departing from the spirit and scope thereof and therefore we do not intend to limit our invention except as indicated in the appended claims.

We claim:

1. The process for the production of a hydrogenation catalyst, which comprises mixing an aqueous solution of ammonium molybdate with an aqueous solution of chromium nitrate and thereby precipitating chromium molybdate, passing hydrogen sulphide through the resulting mixture until the precipitate turns from apple-green to dark brown, adding acid to the mixture until the mother liquor becomes colorless, filtering and washing and drying the precipitate.

2. A catalyst comprising essentially chromium sulphomolybdate, said catalyst being obtained by the process which comprises mixing an aqueous solution of ammonium molybdate with an aqueous solution of chromium nitrate and thereby precipitating chromium molybdate, passing hydrogen sulphide through the resulting mixture until the precipitate turns from apple-green to dark brown, adding nitric acid to the mixture until the mother liquor becomes colorless, filtering and washing and drying the precipitate.

3. The process for the production of a hydrogenation catalyst which comprises treating with hydrogen sulphide a precipitate of chromium molybdate in aqueous suspension.

4. The process for the production of a hydrogenation catalyst which comprises forming a precipitate of chromium molybdate in aqueous suspension and treating said precipitate with hydrogen sulphide to convert the said molybdate to the corresponding sulphomolybdate.

5. A catalyst comprising essentially chromium sulphomolybdate, said catalyst being obtained by the process which comprises treating with hydrogen sulphide a precipitate of chromium molybdate in aqueous suspension.

6. A catalyst comprising essentially chromium sulphomolybdate, said catalyst being obtained by the process which comprises forming a precipitate of chromium molybdate in aqueous suspension and treating said precipitate with hydrogen sulphide to convert the said molybdate to the corresponding sulphomolybdate.

WILBUR ARTHUR LAZIER.
JOHN V. VAUGHEN.